United States Patent
Fernando et al.

(10) Patent No.: US 9,307,549 B2
(45) Date of Patent: Apr. 5, 2016

(54) DYNAMIC SNR ADJUSTMENT IN A RECEIVER SUPPORTING 256QAM

(71) Applicant: QUALCOMM Incorporated, San Diego, CA (US)

(72) Inventors: Udara Charman Fernando, San Diego, CA (US); Supratik Bhattacharjee, San Diego, CA (US); Valentin Alexandru Gheorghiu, Tokyo (JP); Gene Fong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 14/207,492

(22) Filed: Mar. 12, 2014

(65) Prior Publication Data
US 2015/0092681 A1 Apr. 2, 2015

Related U.S. Application Data

(60) Provisional application No. 61/884,869, filed on Sep. 30, 2013.

(51) Int. Cl.
| | |
|---|---|
| *H04W 4/00* | (2009.01) |
| *H04W 72/08* | (2009.01) |
| *H04W 24/10* | (2009.01) |
| *H04B 1/18* | (2006.01) |
| *H04L 1/00* | (2006.01) |
| *H04B 1/10* | (2006.01) |
| *H04L 27/00* | (2006.01) |

(52) U.S. Cl.
CPC ............... *H04W 72/085* (2013.01); *H04B 1/18* (2013.01); *H04L 1/0003* (2013.01); *H04L 1/0038* (2013.01); *H04W 24/10* (2013.01); *H04B 1/1027* (2013.01); *H04L 1/0022* (2013.01); *H04L 1/0025* (2013.01); *H04L 1/0026* (2013.01); *H04L 27/0002* (2013.01)

(58) Field of Classification Search
CPC ............................ H04W 72/085; H04W 24/10
USPC .......................................................... 370/329
See application file for complete search history.

(56) References Cited

U.S. PATENT DOCUMENTS

| | | | |
|---|---|---|---|
| 2010/0279614 A1 | 11/2010 | Hagiwara et al. | |
| 2013/0235919 A1* | 9/2013 | Plevel ................. | H04L 27/0014 375/226 |
| 2013/0251013 A1* | 9/2013 | Banister ................ | H04L 1/0054 375/224 |

FOREIGN PATENT DOCUMENTS

WO 2004114549 A1 12/2004

OTHER PUBLICATIONS

International Search Report and Written Opinion—PCT/US2014/058113—ISA/EPO—Mar. 3, 2015.
Partial International Search Report—PCT/US2014/058113—ISA/EPO—Dec. 8, 2014.

* cited by examiner

*Primary Examiner* — Sai-Ming Chan
(74) *Attorney, Agent, or Firm* — Arent Fox LLP

(57) ABSTRACT

To support very high QAM rates, a user equipment (UE) needs extremely good signal-to-noise ratio (SNR). Using a receiver configuration that improves SNR comes at the expense of higher power consumption. However, consuming higher power to support very high QAM rates when poor channel conditions are present is a waste of power. By correlating the modulation and coding scheme used by the UE with the UE channel quality estimate, the UE can modify the receiver configuration to improve SNR only when channel conditions support very high QAM rates.

30 Claims, 13 Drawing Sheets

Example of a gain lineup

| Gain State | LNA | BB | Gain | NF | |
|---|---|---|---|---|---|
| G0 | 15 | 35 | 50 | 3 | dB |
| G1 | -5 | 30 | 25 | 20 | dB |
| G1(256-QAM) | 15 | 10 | 25 | 4 | dB |

DYNAMIC SNR ADJUSTMENT IN A RECEIVER SUPPORTING 256QAM

CROSS-REFERENCE TO RELATED APPLICATION(S)

This application claims the benefit of U.S. Provisional Application Ser. No. 61/884,869, entitled "DYNAMIC SNR ADJUSTMENT IN A RECEIVER SUPPORTING 256QAM" and filed on Sep. 30, 2013, which is expressly incorporated by reference herein in its entirety.

BACKGROUND

1. Field

The present disclosure relates generally to communication systems, and more particularly, to determining an opportunistic time to change a user equipment (UE) mode of operation from a low signal-to-noise ratio (SNR)-low current mode to a high SNR-high current mode.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus determines to change a mode of operation from a first signal-to-noise ratio (SNR) mode to an increased SNR mode, sends channel quality information (CQI) to a base station indicating an ability to receive data at the increased SNR, and receives the data from the base station according to a higher order modulation and coding scheme (MCS) corresponding to the increased SNR when the base station is capable of providing the data at the higher order MCS.

DETAILED DESCRIPTION

Figure 1:
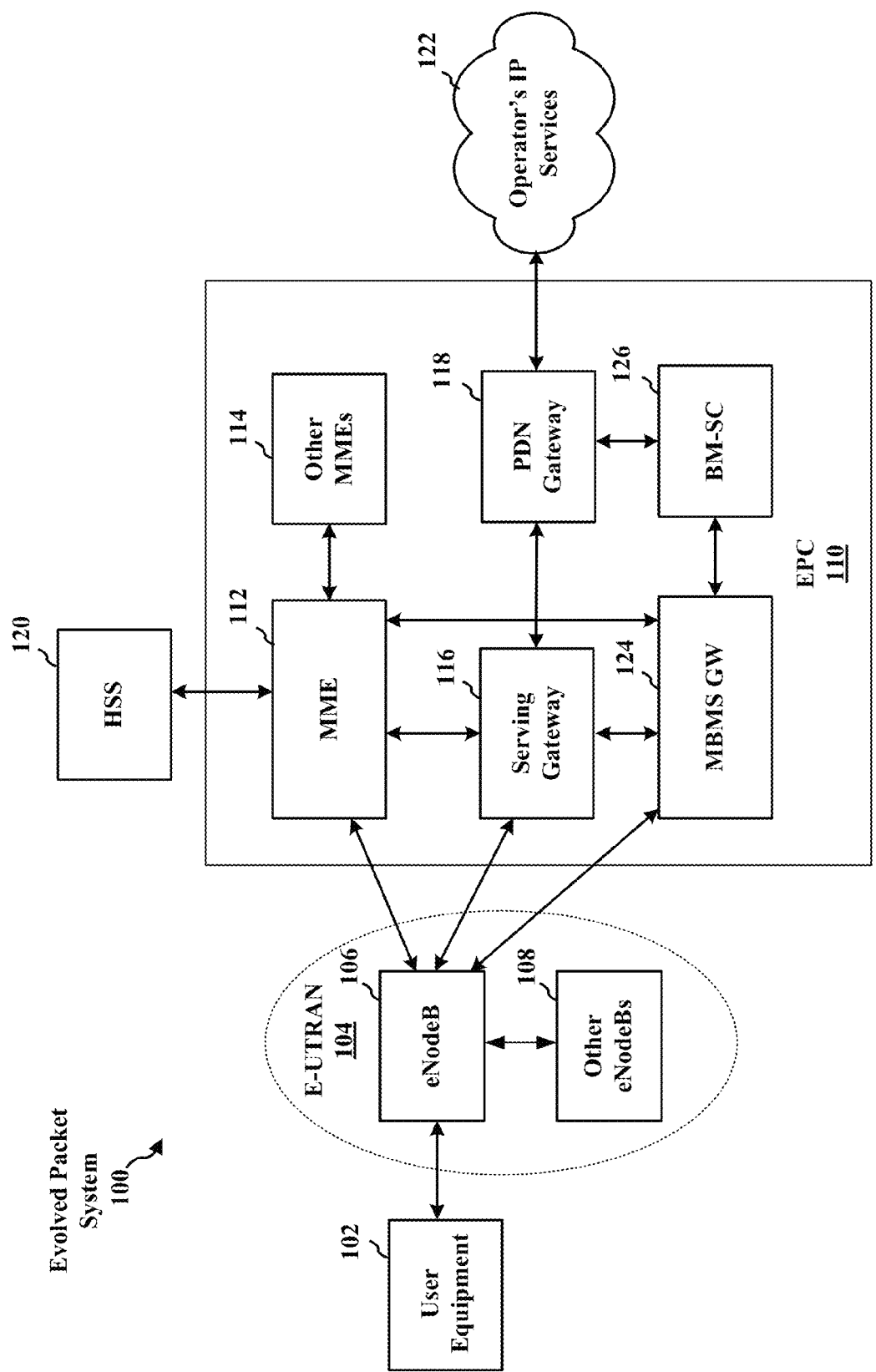
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity these entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
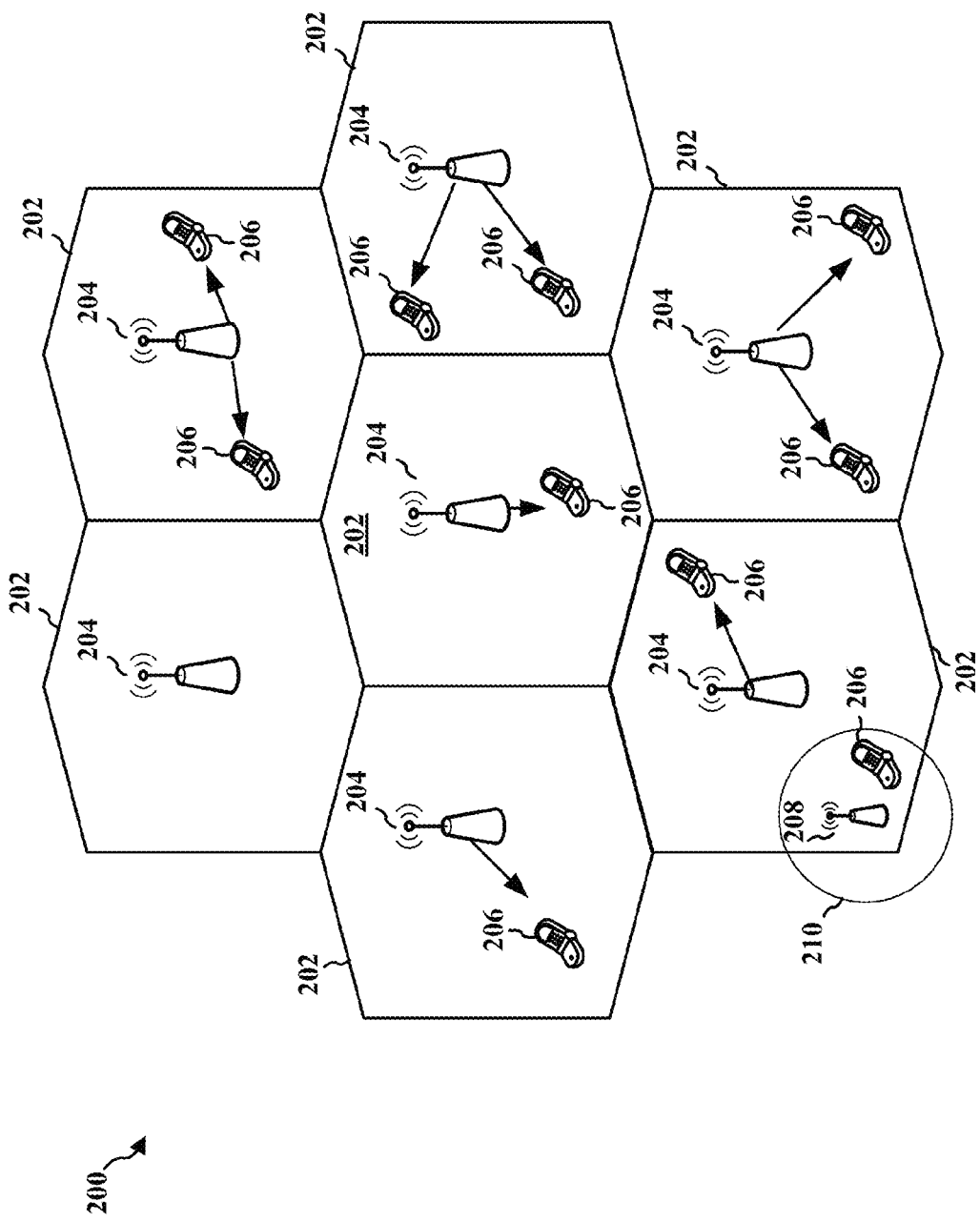
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
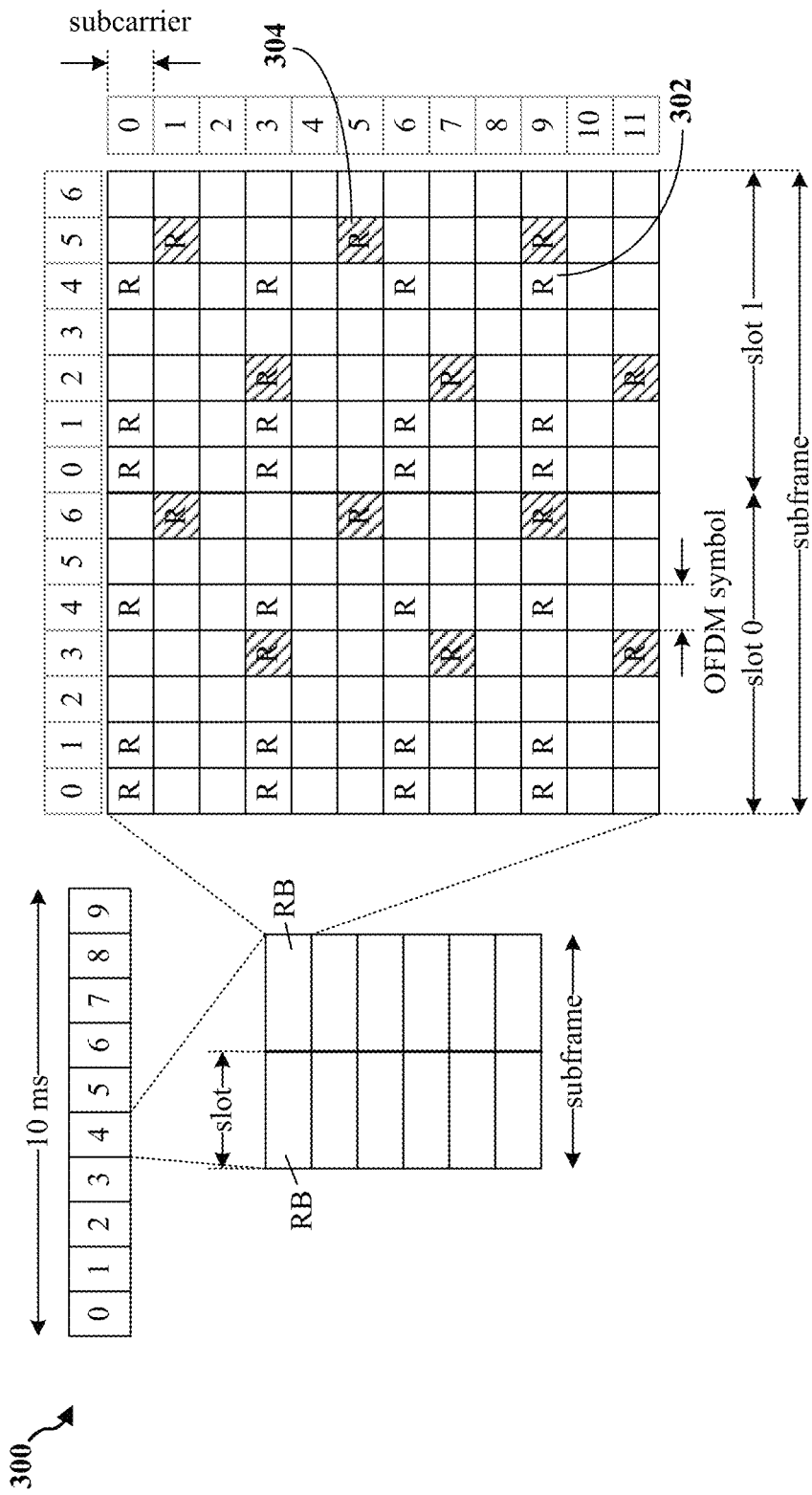
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
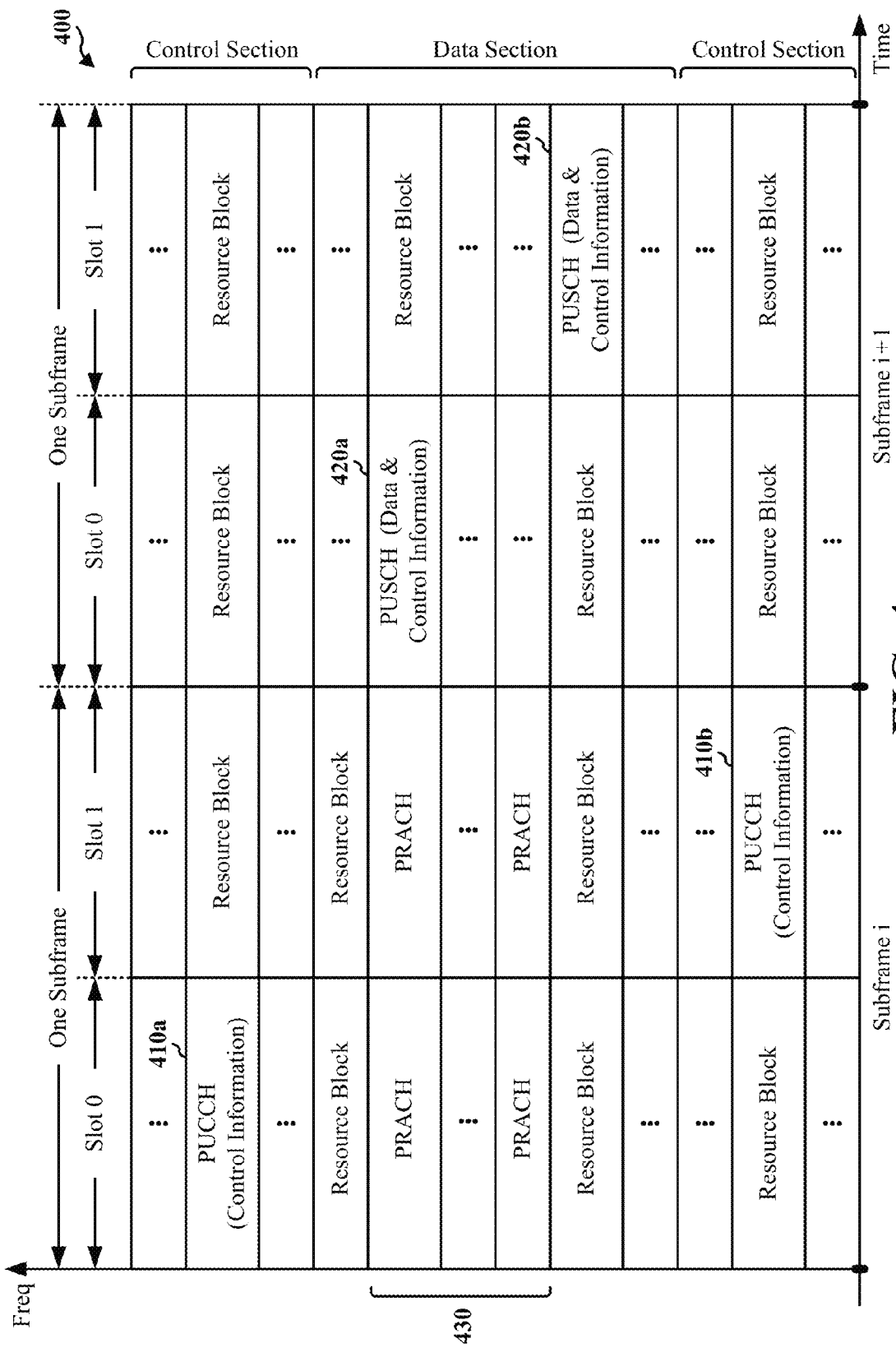
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
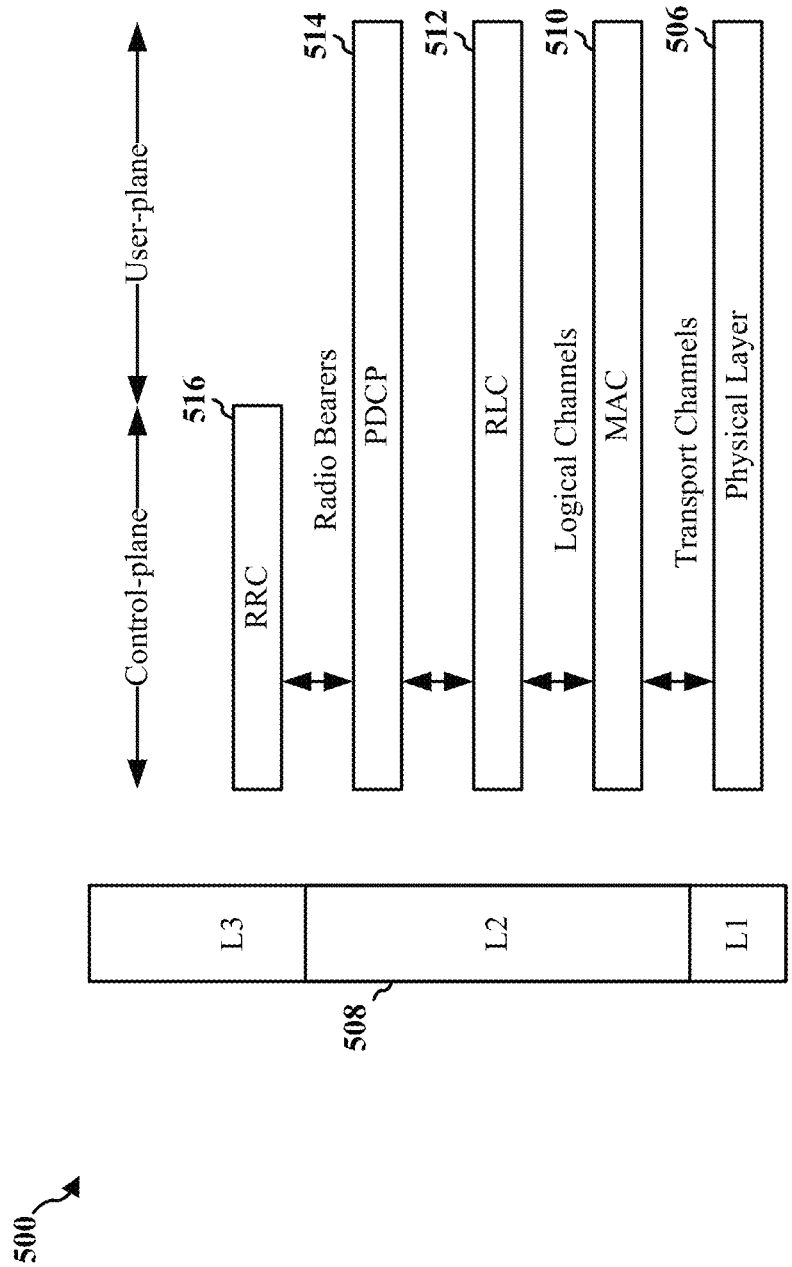
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
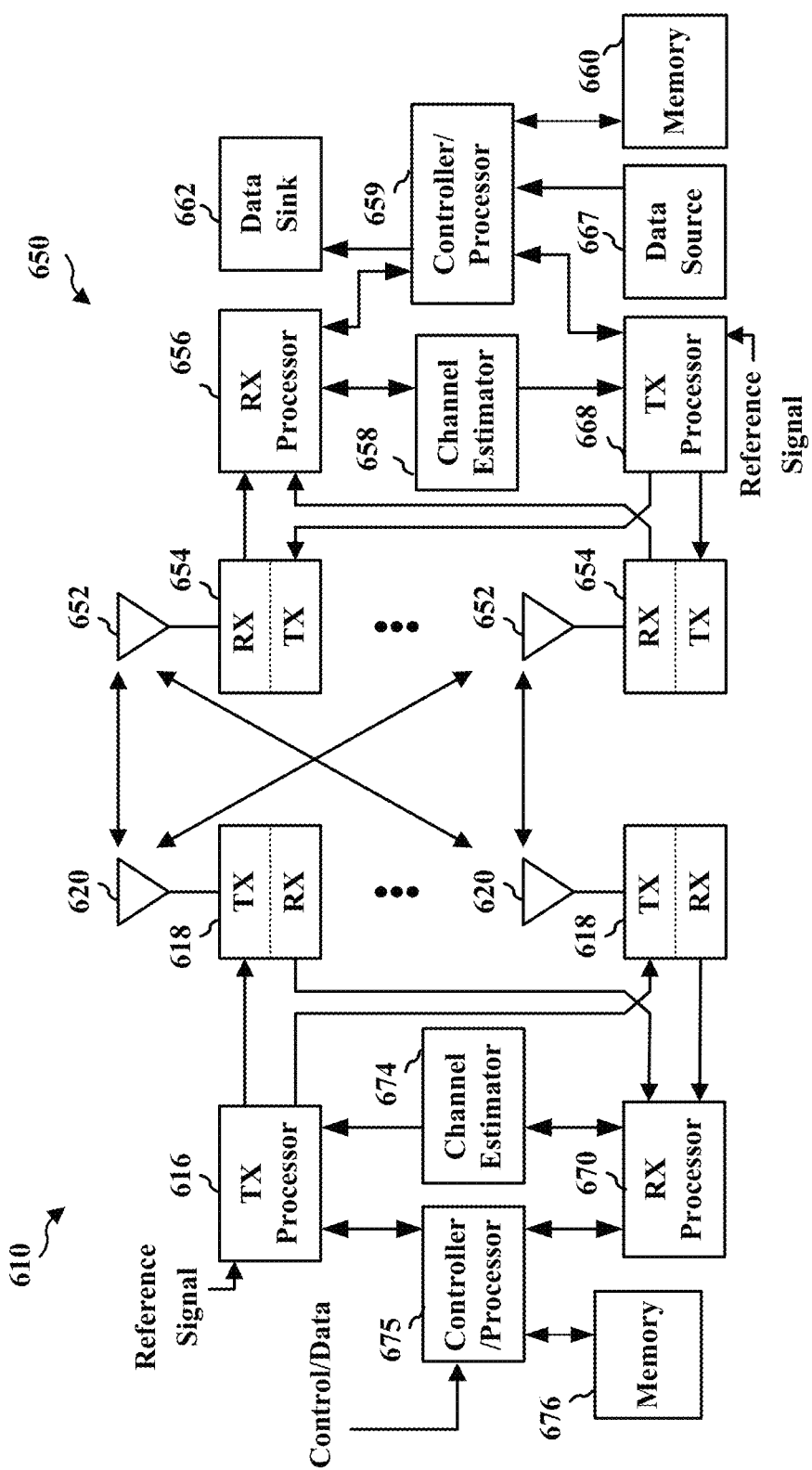
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
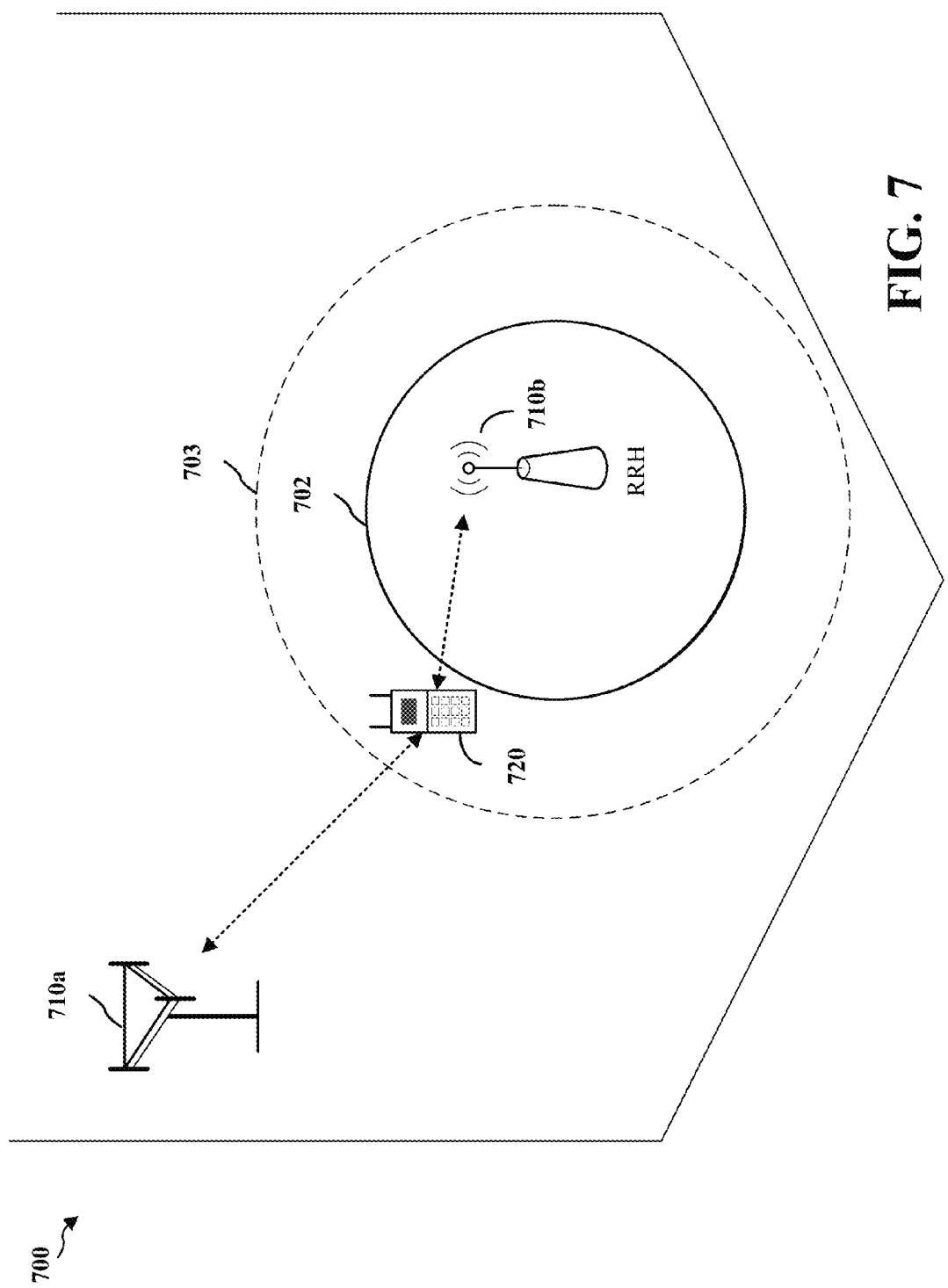
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

In an aspect, the present disclosure is related to 256-quadrature amplitude modulation (QAM). A signal-to-noise ratio (SNR) requirement for supporting 256-QAM may be extremely high and may require a UE to consume a large amount of current. Accordingly, the present disclosure provides a method that facilitates the UE to opportunistically determine when to toggle between a low SNR-low current mode and a high SNR-high current mode.

Figure 8A:
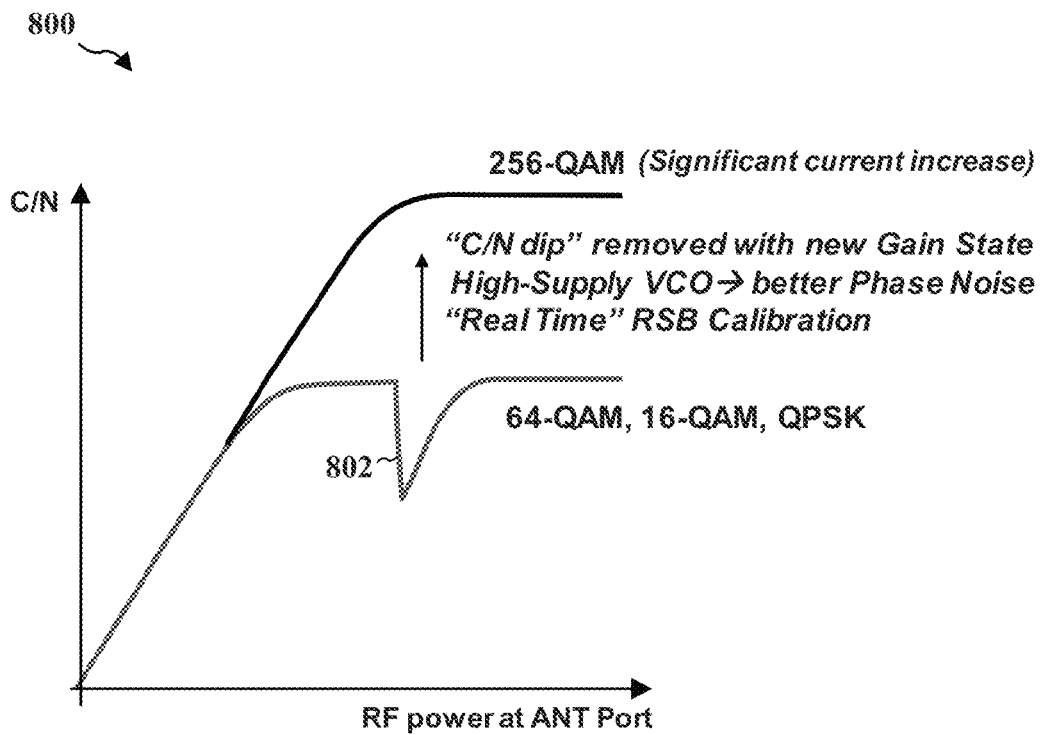
FIG. 8A is a diagram illustrating a relationship between RF power at an antenna port and SNR (or carrier-to-noise ratio (C/N)) for different orders of modulation and coding schemes (MCSs).

FIG. 8A is a diagram 800 illustrating a relationship between RF power at an antenna port and SNR (or carrier-to-noise ratio (C/N)) for different orders of modulation and coding schemes (MCSs). For particular MCSs (e.g., QPSK, 16-QAM, and 64-QAM), the SNR (C/N) may decrease over certain RF power values ("C/N dip" 802). To receive data at higher order MCSs (e.g., 16-QAM or 64-QAM) at a radio receiver, a higher SNR (C/N) is desired. A default UE SNR is sufficient to support 64-QAM. However, such default UE SNR is not sufficient to support 256-QAM. Compared to 64-QAM, to see a measurable throughput gain using 256-QAM, a significant change in receiver configuration is needed at the expense of higher power consumption. As shown in FIG. 8A, the C/N dip 802 may be eliminated by changing a gain state to support 256-QAM.

Figure 8B:
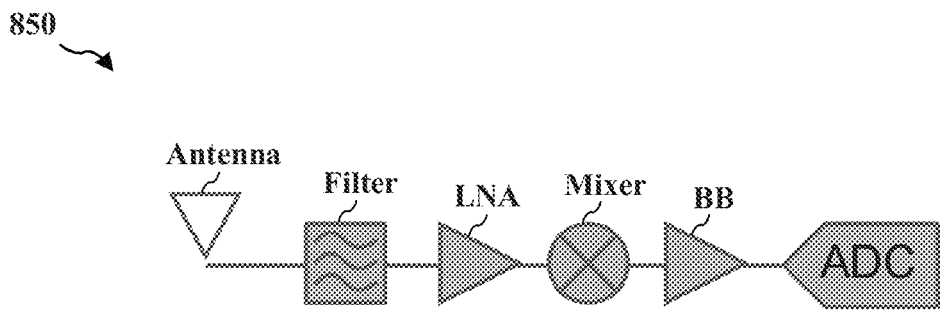
FIG. 8B is a diagram illustrating an example of a gain lineup for a UE.

FIG. 8B is a diagram 850 illustrating an example of a gain lineup for a UE. For example, when the UE is near a base station, the UE may receive a signal at a high strength. Therefore, the UE may not require high gain output at a low noise amplifier (LNA), and the UE may operate at a low gain LNA, low current state. If the UE is at a cell edge, the UE may receive a very weak signal. Hence, the UE may consume a large amount of current to amplify the signal before digitizing the signal at an analog-to-digital converter (ADC). Hence, the UE consumes more current when the UE is at the cell edge.

Different gain states are needed depending on the received signal power at the UE. When a gain state is changed, a noise figure (NF) changes. For example, if 40 dB SNR is desired, a low NF may not be achieved simultaneously. Thus, the UE is forced to operate the LNA at a state that produces a low NF. However, gain may need to be lowered. For example, if the LNA is operated at a high gain mode, too many signals may be received, thus compressing the ADC. Accordingly, what is needed is for the UE to operate at a low gain and low NF at the same time. This may be accomplished by consuming more current, operating the LNA at a high gain state, and cutting the gain at a base band amplifier (BB) located after a mixer (see FIG. 8B). In this way, an overall NF and an overall gain are lowered.

Referring to FIG. 8B, at an initial gain state G0, an overall gain output is 50 dB. At gain state G1, the UE may be near the base station, and therefore, 50 dB gain is unnecessary. For example, 25 dB gain may be sufficient. At 25 dB overall gain, LNA gain is −5 dB, BB gain is 30 dB, and NF is 20 dB (higher than NF at gain state G0). Notably, 20 dB NF may be sufficient for 64-QAM but is too high for 256-QAM. At gain state G1 (256-QAM), the UE achieves an overall gain of 25 dB by operating the LNA at 15 dB gain but reducing the BB gain to 10 dB. This allows an NF of 4 dB, which is sufficient for receiving data at 256-QAM.

Figure 9:
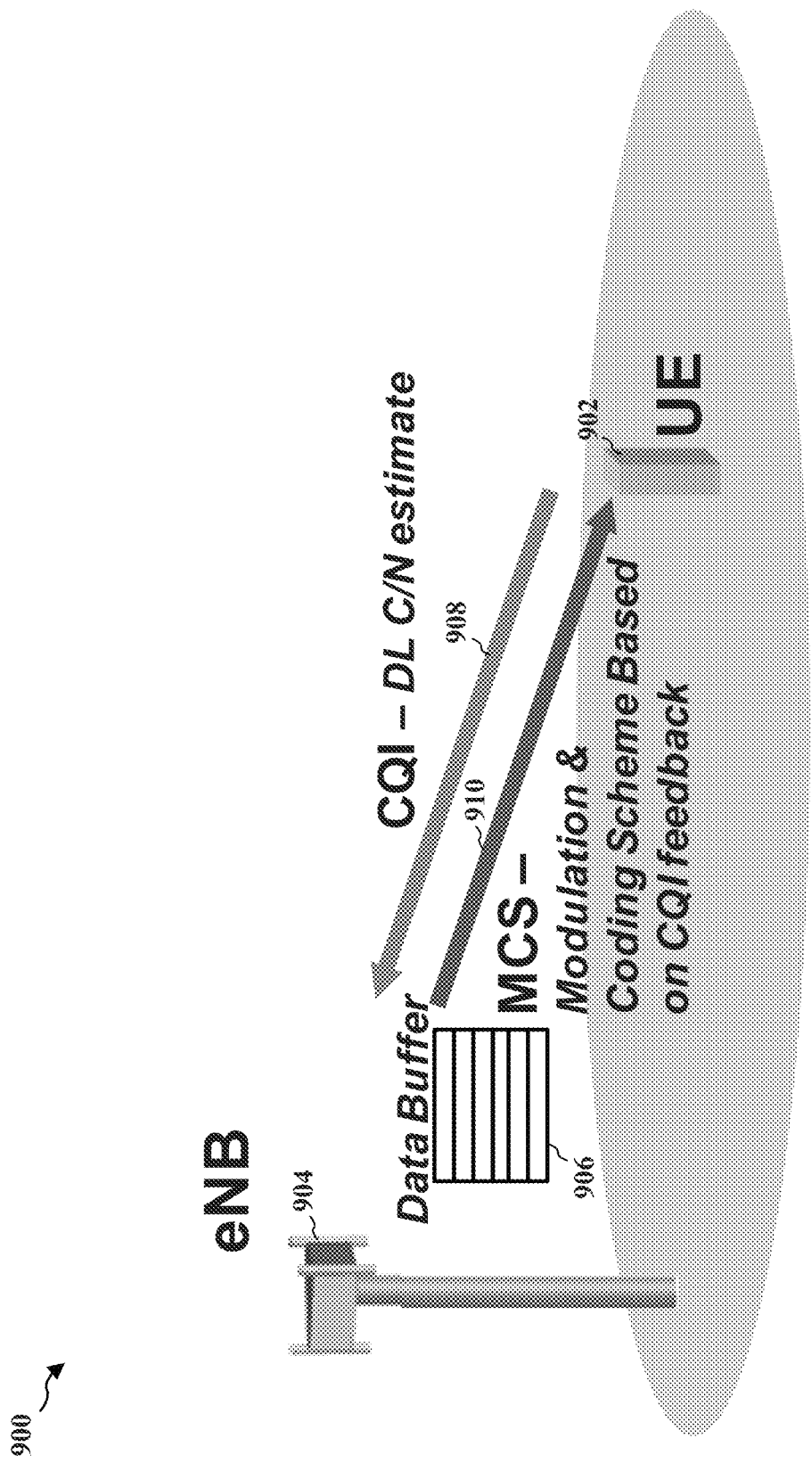
FIG. 9 is a diagram illustrating communication between a UE and base station for determining a modulation and coding scheme.
Figure 10:
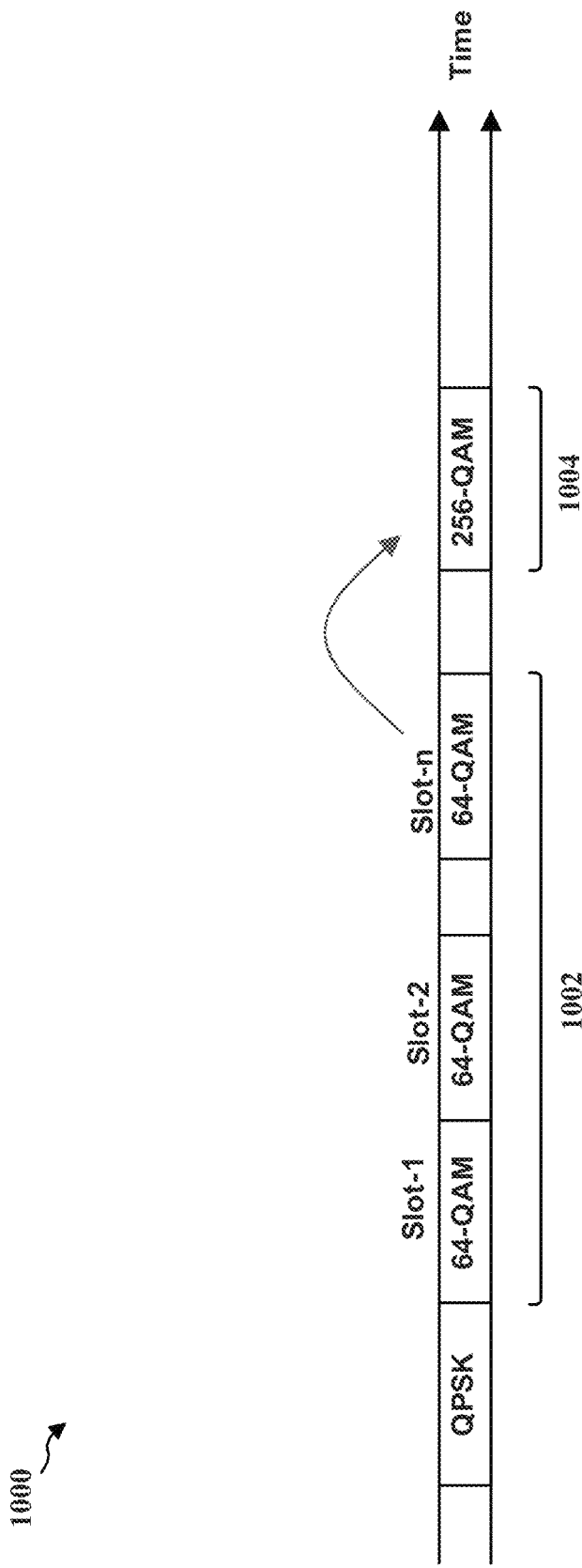
FIG. 10 is a diagram illustrating timeslots for receiving data.

FIG. 9 is a diagram 900 illustrating communication between a UE 902 and a base station (or eNB) 904 for determining a modulation and coding scheme. FIG. 10 is a diagram 1000 illustrating timeslots for receiving data.

In an example, a UE 902 desiring to download a data file (e.g., movie file) may be unaware of a file size. A base station buffer 906 holding the data file along with other data for other UEs is aware of the file size. The base station buffer 906 desirably wishes to send the data file as soon as possible but cannot because of limited bandwidth. Accordingly, the base station 904 schedules to send the data on timeslots (see FIG. 10).

An amount of data the base station 904 can deliver to the UE 902 may depend on the SNR (C/N) of the UE 902 at any given time in a network. Each UE 902 in the network may have a different SNR (C/N) at any given time. The base station 904 knows the amount of data (e.g., transport block size) to schedule for the UE 902 per timeslot based on the UE's channel quality information (CQI) feedback 908. The CQI feedback 908 may include an estimate of the SNR (C/N) measured by the UE 902. In each timeslot, the base station 904 may assign a bandwidth and MCS 910 associated with the data to be sent to the UE 902.

In an aspect, each time the UE 902 decodes a timeslot, the UE 902 determines the SNR (C/N) at that given time. The UE 902 may feed the SNR (C/N) 908 back to the base station 904. Based on the feedback, the base station 904 decides how much data (the transport block size) to send to the UE and what MCS to apply to the data.

Each timeslot, the amount of data that is received by the UE 902 according to different MCSs may change. The data amount may be a function of what the UE 902 is willing to accept or how much data other UEs in the network are receiving.

In an aspect of the disclosure, the amount of data received by the UE (gain state) may not be a function of received power but a function of the MCS used at the time. Referring to FIG. 10, if the UE receives data at an initial MCS (e.g., QPSK or 64-QAM) for n number of slots 1002, then there is a high probability that the UE will be receiving data at the initial MCS for the next several slots. Accordingly, the UE may indicate to the base station that the UE is capable of receiving at a higher SNR (C/N), e.g., approximately 40 dB, which prompts the base station to schedule the data at the higher order MCS (e.g., 256-QAM) 1004. This allows the UE to receive the data in a lesser number of timeslots. For example, at a next CQI feedback opportunity, the UE may change a gain state and operate at a high current mode to maximize SNR. The UE may then send CQI feedback (SNR (C/N) feedback) indicating that the UE is capable of receiving data at the higher SNR (C/N), and begin receiving the data at the higher order MCS (1004). Alternatively, if the UE does not receive any data, or continues to receive data at the initial MCS (e.g., QPSK or 64-QAM) after sending the CQI feedback indicating the higher SNR (C/N), then the UE may determine that the base station is not capable of providing data at the higher order MCS and revert back to a low SNR mode, low current mode.

In an aspect, the UE may shift to a high SNR mode (high current mode) by moving a gain state from G1 to G1 (256-QAM), as shown in FIG. 8B. This allows for a low noise figure (NF) simultaneously with a low gain, and is achieved by a fixed high-gain low noise amplifier (LNA) state and a post-mixer adjustable-gain base band amplifier state. Referring to FIG. 8A, the UE may further shift to the high SNR mode (high current mode) by increasing a voltage-controlled oscillator (VCO)/phase-locked loop (PLL) current, invoking real-time residual side band (RSB) calibration, and/or bypassing front-end lossy components (e.g., filters).

Figure 11:
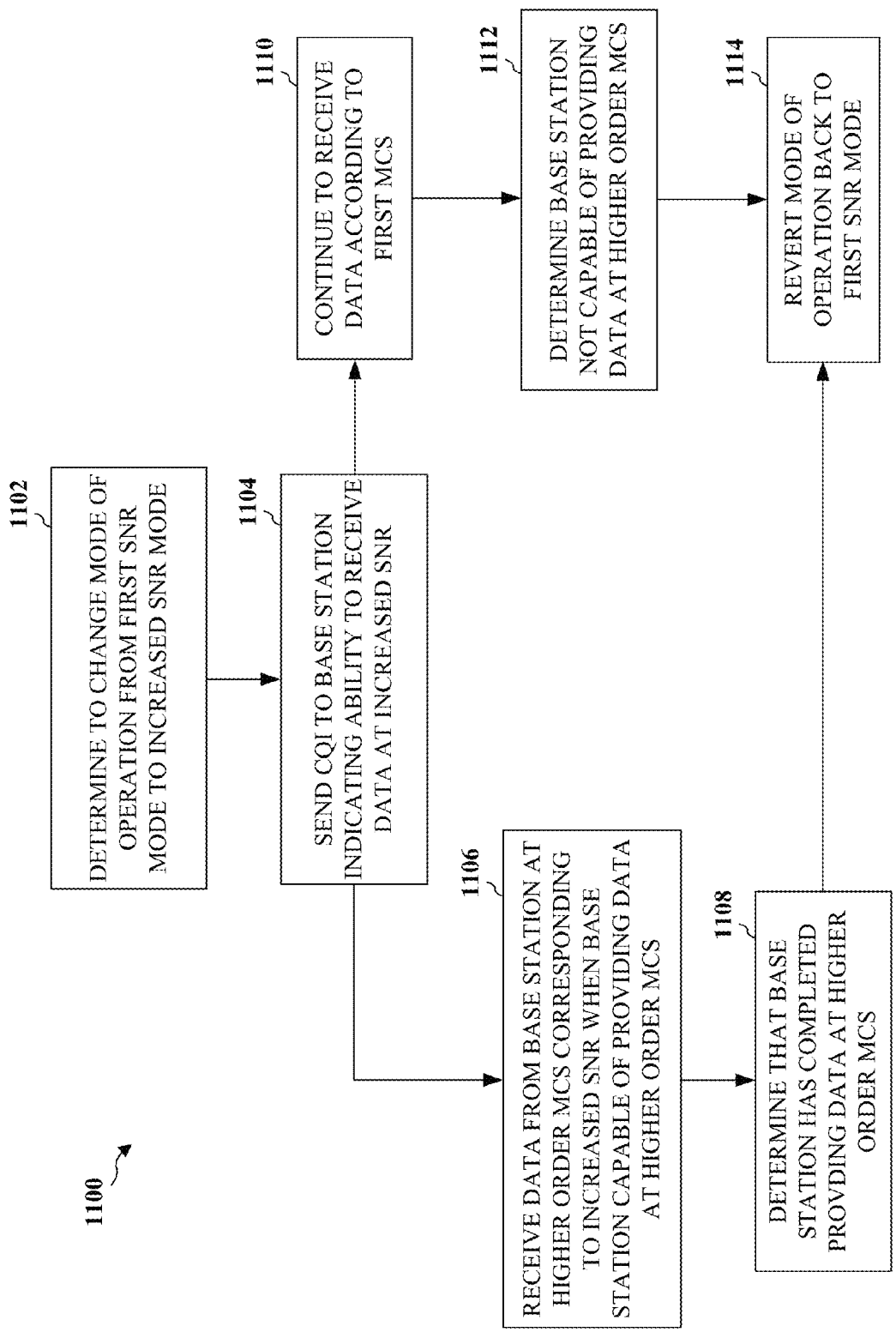
FIG. 11 is a flow chart of a method of wireless communication.

FIG. 11 is a flow chart 1100 of a method of wireless communication. The method may be performed by a UE. At step 1102, the UE determines to change a mode of operation from a first signal-to-noise ratio (SNR) mode to an increased SNR mode.

In an aspect, the UE may determine to change the mode of operation by first obtaining a downlink SNR measurement and thereafter changing the mode of operation to the increased SNR mode based on the downlink SNR measurement. In another aspect, the UE may determine to change the mode of operation by first receiving signaling from a base station indicating the UE to use at least one CQI value corresponding to a higher order modulation and coding scheme (MCS) and thereafter changing the mode of operation to the increased SNR mode based on the received signaling.

In a further aspect, the UE may determine to change the mode of operation by first receiving data from the base station according to a first MCS while operating at the first SNR mode. Thereafter, if the UE continues to receive the data according to the first MCS for a number of consecutive timeslots, the UE may determine that there is a high likelihood that additional data exists in a base station buffer waiting to be scheduled for transmission. Accordingly, the UE changes the mode of operation to the increased SNR mode to receive the additional data at the higher order MCS. In an example, the first MCS may be 64-quadrature amplitude modulation (QAM) while the higher order MCS may be 256-QAM. In another example, the first MCS may be quadrature phase-shift keying (QPSK) while the higher order MCS may be 16-QAM or 64-QAM.

In an aspect, the UE may change the mode of operation to the increased SNR mode by: 1) moving a gain state such that a low noise figure (NF) and a low gain are achieved simultaneously by a fixed high-gain low noise amplifier (LNA) state and a post-mixer adjustable-gain base band amplifier state; 2) increasing a voltage-controlled oscillator (VCO)/phase-locked loop (PLL) current; 3) invoking real-time residual side band (RSB) calibration; and/or 4) bypassing front-end lossy components (e.g., filters). In a further aspect, the UE may receive signaling from the base station via multi-carrier downlink signaling in a network configuration where base station downlink signals are: 1) co-located or not co-located; and/or 2) time-aligned or not time-aligned.

At step 1104, the UE sends channel quality information (CQI) to the base station indicating an ability to receive data at the increased SNR. At step 1106, the UE receives the data from the base station according to the higher order MCS corresponding to the increased SNR when the base station is capable of providing the data at the higher order MCS. At step 1108, the UE may determine that the base station has completed providing the data at the higher order MCS. Accordingly, the UE may proceed to step 1114 and revert the mode of operation back to the first SNR mode.

Alternatively, at step 1110, the UE may continue to receive the data according to the first MCS, or fail to receive any data, after sending the CQI indicating the ability to receive the data at the increased SNR. As such, at step 1112, the UE may determine that the base station is not capable of providing the data at the higher order MCS. Thereafter, at step 1114, the UE may revert the mode of operation back to the first SNR mode.

Figure 12:
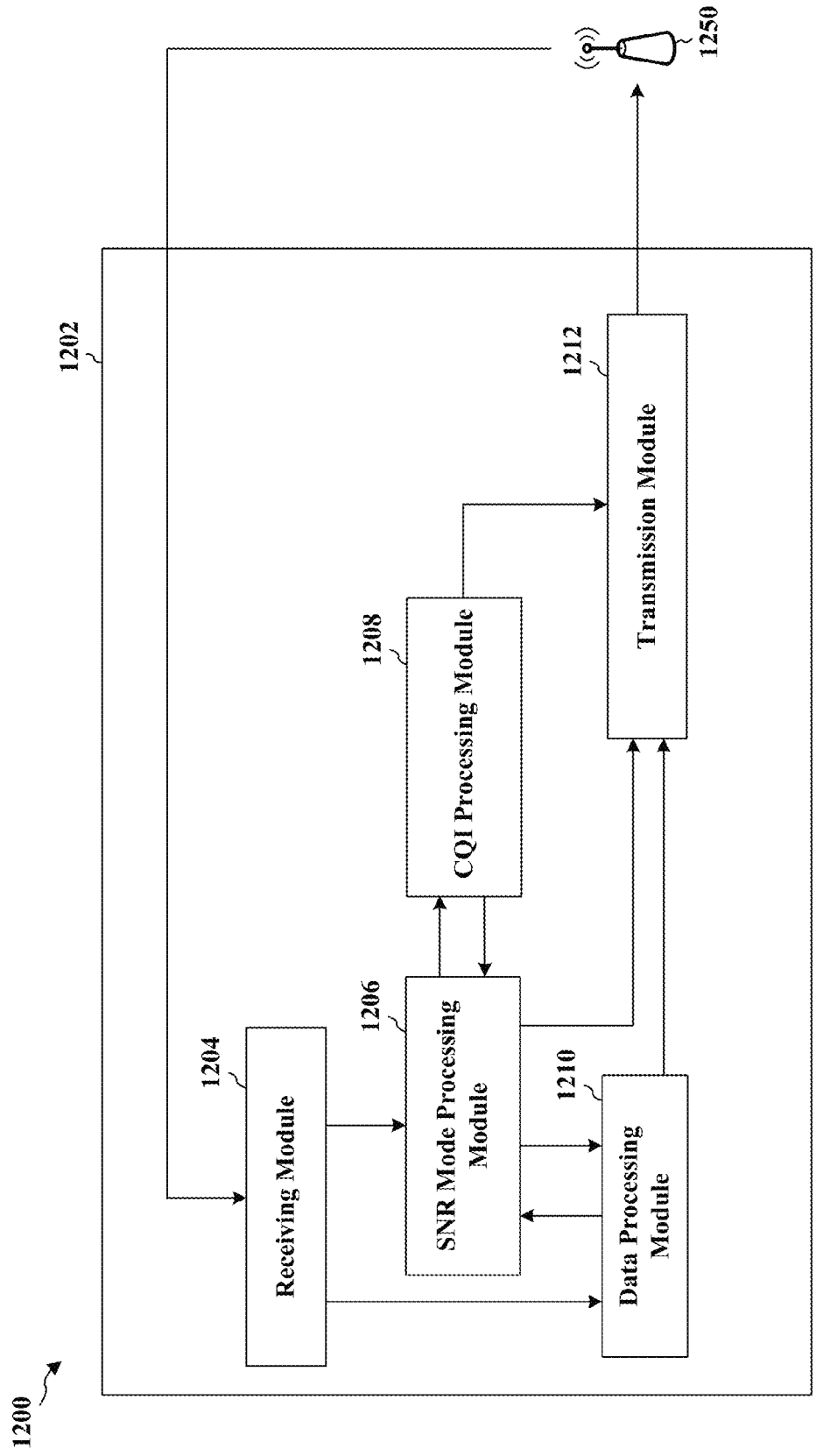
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE. The apparatus includes a receiving module 1204, an SNR mode processing module 1206, a CQI processing module 1208, a data processing module 1210, and a transmission module 1212.

The SNR mode processing module 1206 determines to change a mode of operation from a first signal-to-noise ratio (SNR) mode to an increased SNR mode. In an aspect, the SNR mode processing module 1206 may determine to change the mode of operation by first obtaining a downlink SNR measurement (via the receiving module 1204) and thereafter changing the mode of operation to the increased SNR mode based on the downlink SNR measurement.

In another aspect, the SNR mode processing module 1206 may determine to change the mode of operation when informed by the CQI processing module 1208 of the reception of signaling from a base station 1250 indicating the use of at least one CQI value corresponding to a higher order modulation and coding scheme (MCS). Thereafter, the SNR mode processing module 1206 may change the mode of operation to the increased SNR mode based on the received signaling.

In a further aspect, the SNR mode processing module 1206 may determine to change the mode of operation based on data received from the base station 1250. Here, the data processing module 1210 may first receive the data from the base station 1250 according to a first MCS while operating at the first SNR mode. Thereafter, if the data processing module 1210 continues to receive the data according to the first MCS for a number of consecutive timeslots, the SNR mode processing module 1206 may determine that there is a high likelihood that additional data exists in a base station buffer waiting to be scheduled for transmission. Accordingly, the SNR mode processing module 1206 changes the mode of operation to the increased SNR mode to receive the additional data at the higher order MCS. In an example, the first MCS may be 64-quadrature amplitude modulation (QAM) while the higher order MCS may be 256-QAM. In another example, the first MCS may be quadrature phase-shift keying (QPSK) while the higher order MCS may be 16-QAM or 64-QAM.

In an aspect, the SNR mode processing module 1206 may change the mode of operation to the increased SNR mode by: 1) moving a gain state such that a low noise figure (NF) and a low gain are achieved simultaneously by a fixed high-gain low noise amplifier (LNA) state and a post-mixer adjustable-gain base band amplifier state; 2) increasing a voltage-controlled oscillator (VCO)/phase-locked loop (PLL) current; 3) invoking real-time residual side band (RSB) calibration; and/or 4) bypassing front-end lossy components (e.g., filters). In a further aspect, the receiving module 1204 may receive signaling from the base station 1250 via multi-carrier downlink signaling in a network configuration where base station downlink signals are: 1) co-located or not co-located; and/or 2) time-aligned or not time-aligned.

The CQI processing module 1208 sends (via the transmission module 1212) channel quality information (CQI) to the base station 1250 indicating an ability of the apparatus 1202 to receive data at the increased SNR. The data processing module 1210 receives the data from the base station 1250 according to the higher order MCS corresponding to the increased SNR when the base station 1250 is capable of providing the data at the higher order MCS. The data processing module 1210 may determine that the base station 1250 has completed providing the data at the higher order MCS. Accordingly, the SNR mode processing module 1206 may revert the mode of operation back to the first SNR mode.

Alternatively, the data processing module 1210 may continue to receive the data according to the first MCS, or fail to receive any data, after the CQI processing module 1208 sends the CQI indicating the ability to receive the data at the increased SNR. As such, the SNR mode processing module 1206 may determine that the base station 1250 is not capable of providing the data at the higher order MCS. Thereafter, the SNR mode processing module 1206 may revert the mode of operation back to the first SNR mode.

The apparatus may include additional modules that perform each of the steps of the algorithm in the aforementioned flow chart of FIG. 11. As such, each step in the aforementioned flow chart of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
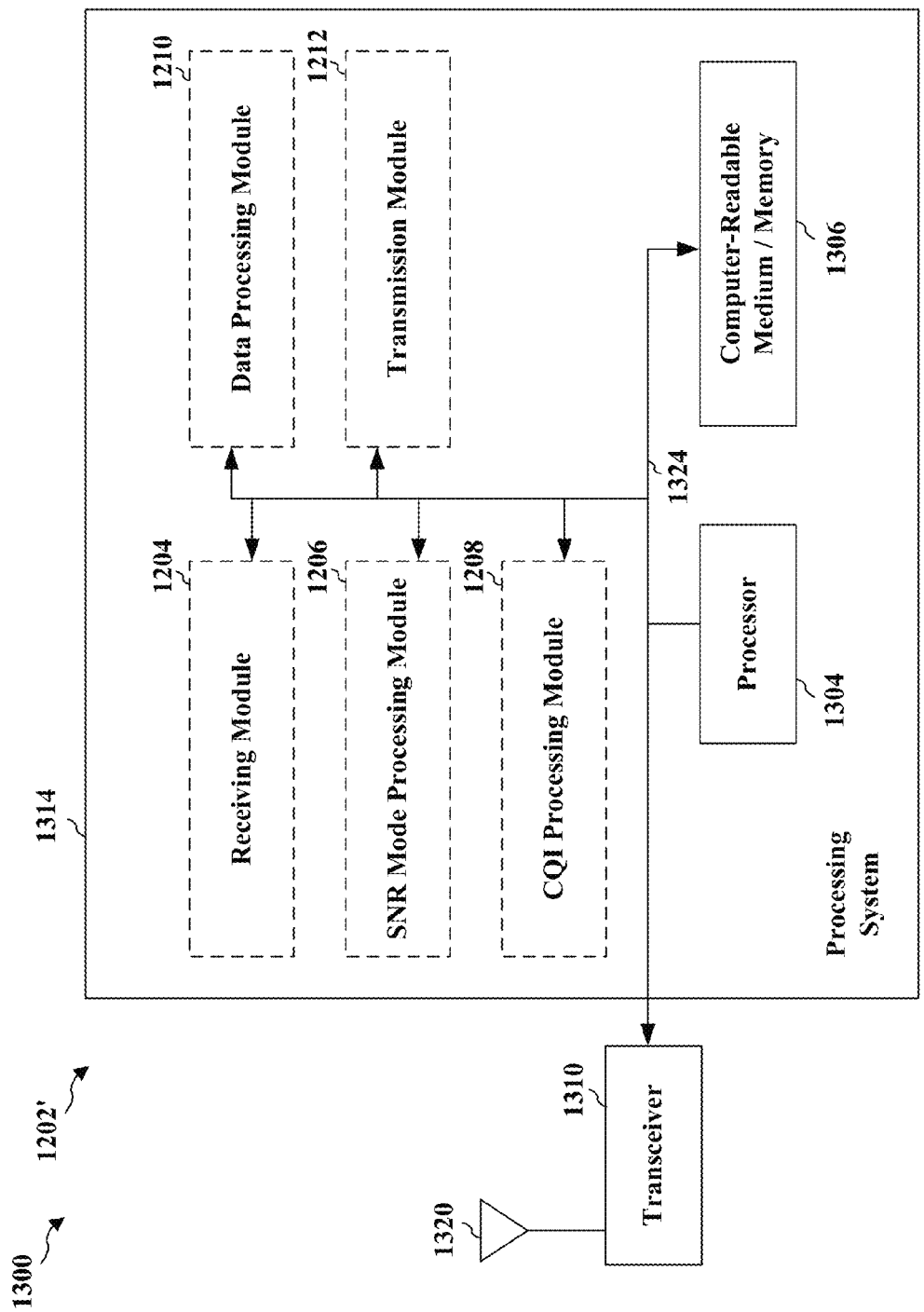
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the receiving module 1204. In addition, the transceiver 1310 receives information from the processing system 1314, specifically the transmission module 1212, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the modules 1204, 1206, 1208, 1210, and 1212. The modules may be software modules running in the processor 1304, resident/stored in the computer readable medium/memory 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 1202/1202' for wireless communication includes means for determining to change a mode of operation from a first signal-to-noise ratio (SNR) mode to an increased SNR mode, means for sending channel quality information (CQI) to a base station indicating an ability to receive data at the increased SNR, means for receiving the data from the base station according to a higher order modulation and coding scheme (MCS) corresponding to the increased SNR when the base station is capable of providing the data at the higher order MCS, means for continuing to receive the data according to the first MCS, or failing to receive any data, after sending the CQI indicating the ability to receive the data at the increased SNR, means for determining that the base station is not capable of providing the data at the higher order MCS, and means for reverting the mode of operation back to the first SNR mode.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a user equipment (UE) including a receiver, comprising:
   changing a mode of operation from a first signal-to-noise ratio (SNR) mode to an increased SNR mode, the mode of operation being changed by adjusting a gain state of at least one of a low-noise amplifier or a baseband amplifier within the receiver;
   sending channel quality information (CQI) to a base station indicating an ability to receive data at the increased SNR; and
   receiving the data from the base station according to a higher order modulation and coding scheme (MCS) corresponding to the increased SNR when the base station is capable of providing the data at the higher order MCS.

2. The method of claim 1, wherein the changing the mode of operation comprises:
   obtaining a downlink SNR measurement; and
   changing the mode of operation to the increased SNR mode based on the downlink SNR measurement.

3. The method of claim 1, wherein the changing the mode of operation comprises:
   receiving signaling from the base station to report at least one CQI value corresponding to the higher order MCS; and
   changing the mode of operation to the increased SNR mode based on the received signaling.

4. The method of claim 1, wherein the changing the mode of operation comprises:
   receiving data from the base station according to a first MCS while operating at the first SNR mode; and
   changing the mode of operation to the increased SNR mode after receiving the data from the base station according to the first MCS for a number of consecutive timeslots.

5. The method of claim 4, further comprising:
   continuing to receive the data according to the first MCS, or failing to receive any data, after sending the CQI indicating the ability to receive the data at the increased SNR;
   determining that the base station is not capable of providing the data at the higher order MCS; and
   reverting the mode of operation back to the first SNR mode.

6. The method of claim 4, wherein the first MCS comprises 64-quadrature amplitude modulation (QAM) and the higher order MCS comprises 256-QAM.

7. The method of claim 4, wherein the first MCS comprises quadrature phase-shift keying (QPSK) and the higher order MCS comprises 16-quadrature amplitude modulation (QAM) or 64-QAM.

8. The method of claim 1, wherein the adjusting the gain state of the at least one of the low-noise amplifier or the baseband amplifier within the receiver comprises:
   moving the gain state such that a low noise figure (NF) and a low gain are achieved simultaneously by a fixed high-gain low noise amplifier state of the low-noise amplifier and a post-mixer adjustable-gain base band amplifier state of the baseband amplifier.

9. The method of claim 8, wherein signaling from the base station is received via multi-carrier downlink signaling in a network configuration where base station downlink signals are:
   co-located or not co-located; or
   time-aligned or not time-aligned.

10. An apparatus for wireless communication, the apparatus being a user equipment (UE) including a receiver and comprising:
    means for changing a mode of operation from a first signal-to-noise ratio (SNR) mode to an increased SNR mode, the mode of operation being changed by adjusting a gain state of at least one of a low-noise amplifier or a baseband amplifier within the receiver;
    means for sending channel quality information (CQI) to a base station indicating an ability to receive data at the increased SNR; and
    means for receiving the data from the base station according to a higher order modulation and coding scheme (MCS) corresponding to the increased SNR when the base station is capable of providing the data at the higher order MCS.

11. The apparatus of claim 10, wherein the means for changing the mode of operation is configured to:
    obtain a downlink SNR measurement; and
    change the mode of operation to the increased SNR mode based on the downlink SNR measurement.

12. The apparatus of claim 10, wherein the means for changing the mode of operation is configured to:
    receive signaling from the base station to report at least one CQI value corresponding to the higher order MCS; and
    change the mode of operation to the increased SNR mode based on the received signaling.

13. The apparatus of claim 10, wherein the means for changing the mode of operation is configured to:
    receive data from the base station according to a first MCS while operating at the first SNR mode; and
    change the mode of operation to the increased SNR mode after receiving the data from the base station according to the first MCS for a number of consecutive timeslots.

14. The apparatus of claim 13, further comprising:
    means for continuing to receive the data according to the first MCS, or failing to receive any data, after sending the CQI indicating the ability to receive the data at the increased SNR;
    means for determining that the base station is not capable of providing the data at the higher order MCS; and
    means for reverting the mode of operation back to the first SNR mode.

15. The apparatus of claim 13, wherein the first MCS comprises 64-quadrature amplitude modulation (QAM) and the higher order MCS comprises 256-QAM.

16. The apparatus of claim 13, wherein the first MCS comprises quadrature phase-shift keying (QPSK) and the higher order MCS comprises 16-quadrature amplitude modulation (QAM) or 64-QAM.

17. The apparatus of claim 10, wherein the adjusting the gain state of the at least one of the low-noise amplifier or the baseband amplifier within the receiver comprises:
    moving the gain state such that a low noise figure (NF) and a low gain are achieved simultaneously by a fixed high-gain low noise amplifier state of the low-noise amplifier and a post-mixer adjustable-gain base band amplifier state of the baseband amplifier.

18. The apparatus of claim 17, wherein signaling from the base station is received via multi-carrier downlink signaling in a network configuration where base station downlink signals are:
    co-located or not co-located; or
    time-aligned or not time-aligned.

19. An apparatus for wireless communication, the apparatus being a user equipment including a receiver and comprising:
a memory; and
at least one processor coupled to the memory and configured to:
change a mode of operation from a first signal-to-noise ratio (SNR) mode to an increased SNR mode, the mode of operation to be changed by adjustment of a gain state of at least one of a low-noise amplifier or a baseband amplifier within the receiver;
send channel quality information (CQI) to a base station indicating an ability to receive data at the increased SNR; and
receive the data from the base station according to a higher order modulation and coding scheme (MCS) corresponding to the increased SNR when the base station is capable of providing the data at the higher order MCS.

20. The apparatus of claim 19, wherein the at least one processor configured to change the mode of operation is configured to:
obtain a downlink SNR measurement; and
change the mode of operation to the increased SNR mode based on the downlink SNR measurement.

21. The apparatus of claim 19, wherein the at least one processor configured to change the mode of operation is configured to:
receive signaling from the base station to report at least one CQI value corresponding to the higher order MCS; and
change the mode of operation to the increased SNR mode based on the received signaling.

22. The apparatus of claim 19, wherein the at least one processor configured to change the mode of operation is configured to:
receive data from the base station according to a first MCS while operating at the first SNR mode; and
change the mode of operation to the increased SNR mode after receiving the data from the base station according to the first MCS for a number of consecutive timeslots.

23. The apparatus of claim 22, the at least one processor further configured to:
continue to receive the data according to the first MCS, or failing to receive any data, after sending the CQI indicating the ability to receive the data at the increased SNR;
determine that the base station is not capable of providing the data at the higher order MCS; and
revert the mode of operation back to the first SNR mode.

24. The apparatus of claim 22, wherein the first MCS comprises 64-quadrature amplitude modulation (QAM) and the higher order MCS comprises 256-QAM.

25. The apparatus of claim 22, wherein the first MCS comprises quadrature phase-shift keying (QPSK) and the higher order MCS comprises 16-quadrature amplitude modulation (QAM) or 64-QAM.

26. The apparatus of claim 19, wherein the adjustment of the gain state of the at least one of the low-noise amplifier or the baseband amplifier within the receiver comprises:
moving the gain state such that a low noise figure (NF) and a low gain are achieved simultaneously by a fixed high-gain low noise amplifier state of the low-noise amplifier and a post-mixer adjustable-gain base band amplifier state of the baseband amplifier.

27. The apparatus of claim 26, wherein signaling from the base station is received via multi-carrier downlink signaling in a network configuration where base station downlink signals are:
co-located or not co-located; or
time-aligned or not time-aligned.

28. A non-transitory computer-readable medium storing computer-executable code for wireless communication of a user equipment (UE) including a receiver, comprising code for:
changing a mode of operation from a first signal-to-noise ratio (SNR) mode to an increased SNR mode, the mode of operation being changed by adjusting a gain state of at least one of a low-noise amplifier or a baseband amplifier within the receiver;
sending channel quality information (CQI) to a base station indicating an ability to receive data at the increased SNR; and
receiving the data from the base station according to a higher order modulation and coding scheme (MCS) corresponding to the increased SNR when the base station is capable of providing the data at the higher order MCS.

29. The method of claim 1, wherein the mode of operation is further changed to the increased SNR mode by at least one of:
increasing a voltage-controlled oscillator (VCO)/phase-locked loop (PLL) current;
invoking real-time residual side band (RSB) calibration; or
bypassing front-end lossy components.

30. The apparatus of claim 10, wherein the mode of operation is further changed to the increased SNR mode by at least one of:
increasing a voltage-controlled oscillator (VCO)/phase-locked loop (PLL) current;
invoking real-time residual side band (RSB) calibration; or
bypassing front-end lossy components.

* * * * *